US010294904B2

(12) United States Patent
Tanaka et al.

(10) Patent No.: US 10,294,904 B2
(45) Date of Patent: May 21, 2019

(54) PROTECTIVE STRUCTURE FOR FUEL PIPE

(71) Applicant: HONDA MOTOR CO., LTD., Tokyo (JP)

(72) Inventors: Shun Tanaka, Wako (JP); Naoki Sato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/468,208

(22) Filed: Mar. 24, 2017

(65) Prior Publication Data
US 2017/0306909 A1    Oct. 26, 2017

(30) Foreign Application Priority Data

Apr. 20, 2016  (JP) ................................. 2016-084439

(51) Int. Cl.
*F02M 55/02*     (2006.01)
*F02M 69/46*     (2006.01)
(Continued)

(52) U.S. Cl.
CPC ............. *F02M 55/02* (2013.01); *B60K 15/01* (2013.01); *F02M 35/104* (2013.01);
(Continued)

(58) Field of Classification Search
CPC ........... F02M 35/104; F02M 35/10216; F02M 55/025; F02M 69/465
(Continued)

(56) References Cited

U.S. PATENT DOCUMENTS 6,340,019 B1 *  1/2002  Eshleman ............ F02M 69/465
                                                        123/469
6,817,337 B1 * 11/2004  Siring ............... F02M 35/10144
                                                        123/195 A
(Continued)

FOREIGN PATENT DOCUMENTS

CN       104999896 A    10/2015
JP       H11-223164 A    8/1999
(Continued)

OTHER PUBLICATIONS

Second Review Notice for Chinese Patent Application No. 201710263525.8, dated Jan. 18, 2019, 4 pages.

*Primary Examiner* — Erick R Solis
(74) *Attorney, Agent, or Firm* — Armstrong Teasdale LLP

(57) ABSTRACT

Provided is a protective structure (64) for a fuel pipe (45) extending along the intake side of an engine main body (9) under an intake manifold (20). A protective member (61) is placed in front of the fuel pipe. The protective member includes a pair of legs (64, 65) secured to the intake side of the engine main body, a main body (63) extending from the legs upward in an arcuate manner along a front side of the fuel pipe and bent rearward in an upper part thereof, and an abutting projection (63G) extending from an upper end of the main body and projecting upward and rearward. A fastening member (26, 27) is passed through a flange of the intake manifold, and includes an engagement feature (36) positioned behind a free end of the abutting projection. The protective member minimizes the loading transmitted to the fuel pipe at the time of a vehicle crash.

9 Claims, 9 Drawing Sheets

(51) Int. Cl.
*F02M 35/10* (2006.01)
*B60K 15/01* (2006.01)
*F02M 35/104* (2006.01)
*F02M 61/14* (2006.01)

(52) U.S. Cl.
CPC ............... *F02M 35/10085* (2013.01); *F02M 35/10216* (2013.01); *F02M 61/14* (2013.01); *F02M 69/465* (2013.01); *F02M 55/025* (2013.01); *F02M 2200/185* (2013.01); *F02M 2200/855* (2013.01)

(58) Field of Classification Search
USPC .................................................. 123/468, 469
See application file for complete search history.

(56) References Cited

U.S. PATENT DOCUMENTS

| | | | | |
|---|---|---|---|---|
| 7,063,074 | B2* | 6/2006 | Horibe | F02M 35/10078 123/468 |
| 8,028,673 | B2* | 10/2011 | Olsen | F02B 77/00 123/198 D |
| 9,664,164 | B2* | 5/2017 | Imakita | F02M 55/025 |
| 2006/0005800 | A1* | 1/2006 | Fujii | F02M 35/10144 123/195 C |
| 2006/0016414 | A1* | 1/2006 | Kogawa | F02M 35/10052 123/184.42 |
| 2006/0162699 | A1* | 7/2006 | Schreeck | F02M 35/024 123/468 |
| 2009/0107450 | A1* | 4/2009 | Olsen | F02B 77/00 123/195 C |
| 2010/0001897 | A1* | 1/2010 | Lyman | B60T 7/22 342/70 |
| 2014/0123951 | A1* | 5/2014 | Imakita | F02M 55/025 123/469 |
| 2014/0347485 | A1* | 11/2014 | Zhang | B60R 11/04 348/148 |
| 2015/0305177 | A1 | 10/2015 | Nakashima | |
| 2016/0304090 | A1* | 10/2016 | Fujishiro | B60T 7/22 |
| 2016/0341160 | A1* | 11/2016 | Dominic | F02M 35/1034 |
| 2018/0128224 | A1* | 5/2018 | Spurling | F02M 55/025 |

FOREIGN PATENT DOCUMENTS

| | | |
|---|---|---|
| JP | 2001182637 A | 7/2001 |
| JP | 2003-035228 A | 2/2003 |
| JP | 2004-245147 A | 9/2004 |
| JP | 2006-046330 A | 2/2006 |
| JP | 2006-069313 A | 3/2006 |
| JP | 2007-239710 A | 9/2007 |
| JP | 2008-111401 A | 5/2008 |
| JP | 2014095323 A | 5/2014 |

* cited by examiner

PROTECTIVE STRUCTURE FOR FUEL PIPE

TECHNICAL FIELD

The present invention relates to a protective structure for a fuel pipe that extends along an intake side of a main body of an internal combustion engine.

BACKGROUND ART

In a vehicle engine, for the purpose of protecting a fuel pipe for supplying fuel to a fuel injector from the loading of a frontal vehicle crash, it is known to cover a side of the fuel pipe facing away from the cylinder block with a protective member. See JP2014-95323A, for instance.

However, the protective member for protecting a fuel pipe disclosed in this patent document consists of a cantilever extending upward so that the protective member is required to have a significant thickness in order to withstand a loading of a vehicle crash. This problem is particularly acute when a device such as a radar for detecting objects ahead of the vehicle is installed in a front part of the engine room because the crash loading may be transmitted to the protective member via the device typically housed in a mechanically stiff casing.

SUMMARY OF THE INVENTION

The present invention was made in view of such a problem of the prior art, and has a primary object to provide a protective structure for a fuel pipe that can minimize the loading transmitted to the fuel pipe at the time of a vehicle crash.

To achieve such an object, the present invention provides a protective structure for a fuel pipe, comprising: an engine main body (9) having a plurality of intake ports opening out on an intake side (6A) thereof facing forward; an intake manifold (20) attached to the intake side via a fastening member (26, 27A), and extending upward in an arcuate manner; a fuel pipe (45) extending along the intake side under the intake manifold and connected to a plurality of injectors (42) fitted into the engine main body; and a protective member (61) having at least one leg (64, 65) secured to the intake side, a main body (63) extending from the at least one leg upward in an arcuate manner with a convex side facing forward along a front side of the fuel pipe and bent rearward in an upper part thereof, and an abutting projection (63G) extending from an upper end of the main body and projecting upward and rearward; wherein the fastening member includes an engagement feature (36) positioned behind a free end of the abutting projection.

When an impact load caused by a frontal crash is applied to the protective member, and bends the protective member rearward, the abutting projection is pushed against the engagement feature. The protective member is therefore supported both by the engagement feature of the fastening member and the at least one leg so that the rearward displacement of the main body of the protective member is minimized, and the fuel pipe is therefore favorably protected from the impact of the crash. Because the engagement feature is provided on a part of the fastening member which is raised from the intake side of the engine main body, the length of the part of the protective member extending between the point of impact (front end) of the protective member to the free end of the abutting projection is reduced as compared to the case where the engagement feature is provided directly on the intake side, and the stiffness of the corresponding part of the protective member is increased. Also, the elimination of the need to form the engagement feature in the intake side contributes to the reduction in manufacturing cost.

Preferably, the main body of the protective member does not overlap with the fastening member as seen from an axial direction of the fastening member.

Thereby, the assembly and dismantling of the fastening member and the intake manifold are not obstructed by the protective member.

According to a preferred embodiment of the present invention, the engagement feature includes a recess defined by an upper slanted surface and a lower slanted surface, the two slanted surfaces opposing the free end of the abutting projection in such a manner that the free end of the abutting projection slides over the upper slanted surface, and is restrained by the lower slanted surface when the protective member is deformed under an impact of a crash.

Thereby, as the protective member bends under the impact of a vehicle crash, the free end of the abutting projection is positively engaged by the recess so that the protective member is enabled to withstand the impact without undergoing any undue deformation, and favorably protect the fuel pipe.

The recess may comprise an annular groove having a V-shaped cross section so that the free end of the abutting projection may be positively restrained by using a feature that can be economically created. Using the annular groove as the engagement feature is particularly advantageous when the fastening member is required to be turned for it to be fastened because the engagement feature can perform the function thereof without regard to the angular position of the fastening member.

Preferably, the engagement feature of the fastening member and the free end of the abutting projection are laterally aligned with each other so that the impact on the protective member may be most efficiently supported by the engagement feature of the fastening member.

In particular, when a sensor for detecting an object ahead of a vehicle is positioned in front of the protective member, a highly localized impact may be applied to the fuel pipe. In such a case, the protective member mentioned above is highly effective in preventing damages to the fuel pipe at the time of a frontal crash.

Preferably, the engagement feature of the fastening member and the free end of the abutting projection are configured to abut each other in a complementary manner when the protective member is deformed under an impact of a crash.

Thereby, the force of the impact can be evenly distributed on the fastening member so that the protective member can be prevented from unduly deforming even under a relatively severe crash impact.

Typically, the fastening member includes a stud bolt projecting from the intake side of the engine main body and a nut threaded onto the stud bolt, the engagement feature being formed in the nut.

According to this arrangement, the engagement feature can be conveniently formed in the nut which may be increased in size in comparison with the remaining nuts so that the nut with the engagement feature may better withstand a crash impact. Alternatively, the fastening member may consist of a bolt which is passed through a part of the intake manifold such as a flange thereof, and threaded into a threaded hole formed in the fastening surface of the engine main body such as the cylinder head. In such a case, the head of the bolt may be enlarged so that an engagement feature may be formed in the head of the bolt.

According to a preferred embodiment of the present invention, the nut has a cylindrical member centrally formed with a threaded bore and defining an abutting surface configured to abut the intake side of the engine main body in an axial end thereof, and a tool engagement feature provided in an opposite axial end of the cylindrical member remote from the abutting surface.

Thereby, the manufacturing of the fastening member can be facilitated.

According to a preferred embodiment of the present invention, the abutting surface of the nut comprises an annular surface having a same configuration as a contact surface of another nut used for fastening a remaining part of the intake manifold, and the tool engagement feature is same as that of the other nut.

Thereby, the nut with the engagement feature can provide a same fastening force as the remaining nut so that a uniform fastening of the intake manifold typically via the flange thereof can be accomplished, and a same tool may be used (with a same fastening torque) for all of the nuts so that the assembling process is simplified.

According to a preferred embodiment of the present invention, the protective member is at least partly covered by polymer material (62). The polymer material serves as a sound insulator that muffles the noises emitted from the fuel pipe and other parts of the engine, and may additionally provide a cushioning action for the fuel pipe at the time of a crash.

According to a preferred embodiment of the present invention, the protective member is provided with a depending piece (67, 68) depending from an edge of the main body thereof, and having a free end positioned in a spaced apart relationship to the intake side of the engine main body. The depending piece is normally spaced from the engine maim body, but at the time of a crash, a slight deformation of the protective member causes the depending piece to abut the opposing side wall of the engine main body so that the protective member is reinforced by the support provided by the depending piece.

According to a preferred embodiment of the present invention, the main body of the protective member is provided with a part (63D) bent from a remaining part of the main body so as to extend at a greater distance from the intake side than the remaining part of the main body. The part of the main body of the protective member extending at a greater distance from the intake side may be used for accommodating a component part such as a fuel pressure sensor for detecting the fuel pressure.

DESCRIPTION OF THE PREFERRED EMBODIMENT(S)

A preferred embodiment of the present invention is described in the following with reference to the appended drawings.

Figure 1:
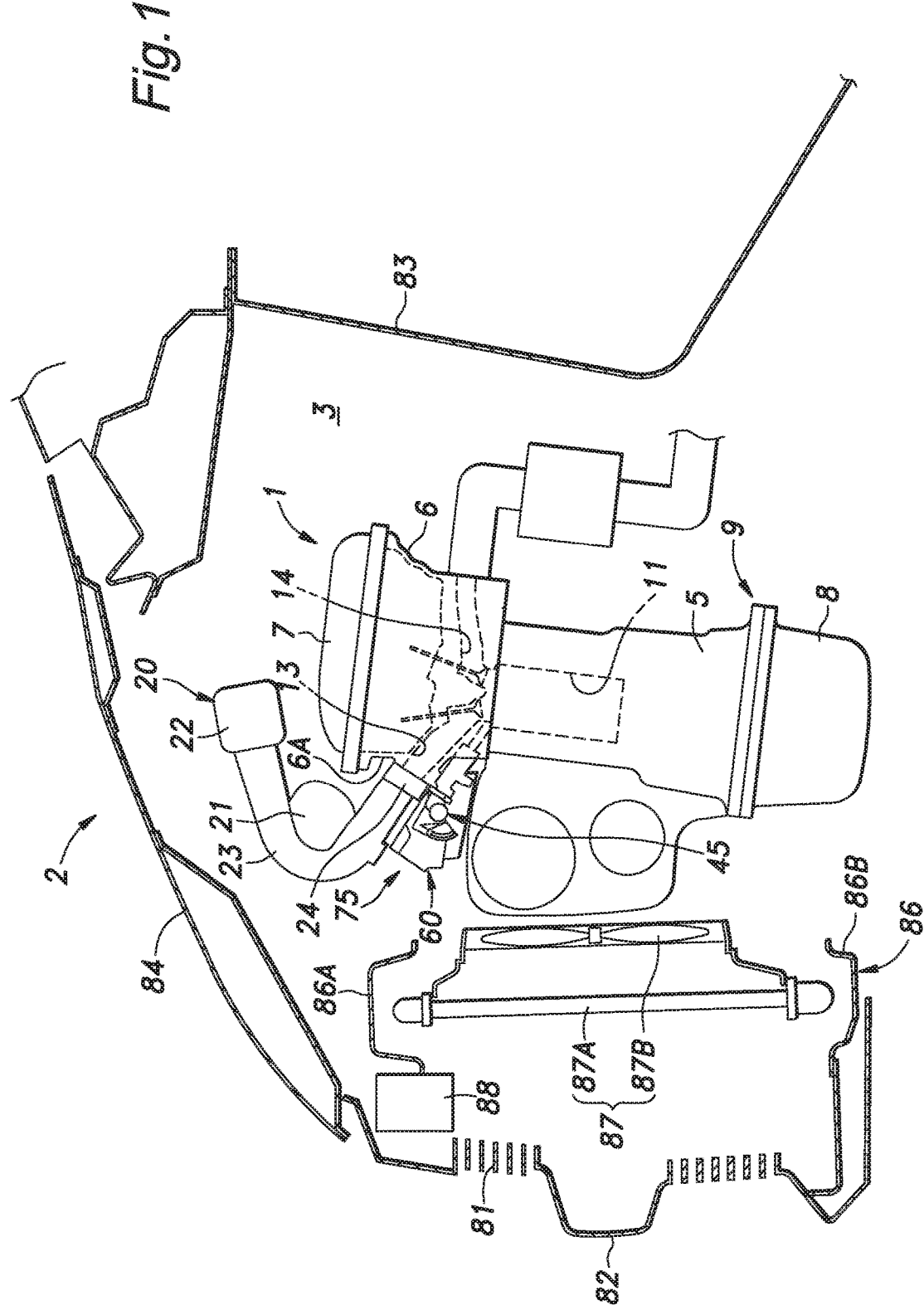
FIG. 1 is a simplified sectional side view of a front part of a vehicle body.

Referring to FIG. 1, an engine 1 is mounted in an engine room 3 defined in a front part of a vehicle body 2. The engine 1 consists of an in-line four-cylinder gasoline engine with a direct fuel injection, and is transversely mounted with a rearward slant. The engine 1 may also be a diesel engine.

The engine 1 includes a main body 9 consisting of a cylinder block 5, a cylinder head 6 attached to the upper end of the cylinder block 5, a head cover 7 attached to the upper end of the cylinder head 6, and an oil pan 8 attached to the lower end of the cylinder block 5. The cylinder block 5 internally defines four cylinders 11, and corresponding four combustion chambers 12 jointly with the cylinder head 6. Four intake ports 13 communicating with the respective combustion chambers 12 open out on the front side or the intake side 6A of the cylinder head 6, and four exhaust ports 14 open out on the rear side or the exhaust side of the cylinder head 6.

As shown in FIGS. 1 to 6, a planar fastening surface 17 (facing forward and upward) is defined around the intake ports 13. An intake manifold 20 is fastened to the fastening surface 17. The intake manifold 20 includes a common pipe 21, an intake chamber 22 and branch pipes 23 branching out from the intake chamber 22, in that order from the upstream end thereof. The downstream ends of the branch pipes 23 are arranged in a row, and are commonly provided with an intake manifold flange 24 by which the intake manifold 20 is attached to the fastening surface 17.

Each branch pipe 23 extends forward and upward from the intake manifold flange 24, and curves upward and rearward. The intake chamber 22 is elongated in the cylinder row direction, and is positioned above the head cover 7. The branch pipes 23 are connected to the front side of the intake chamber 22, and the common pipe 21 is also connected to the front side of the intake chamber 22 between the two middle branch pipes 23. The common pipe 21 extends from the intake chamber 22 forward and downward, and curves in the cylinder row direction in a gap defined between the branch pipes 23 and the opposing side of the cylinder block 5. The upstream end of the common pipe 21 is connected to an air inlet via a throttle valve and an air cleaner (not shown in the drawings) in a per se known manner.

Figure 2:
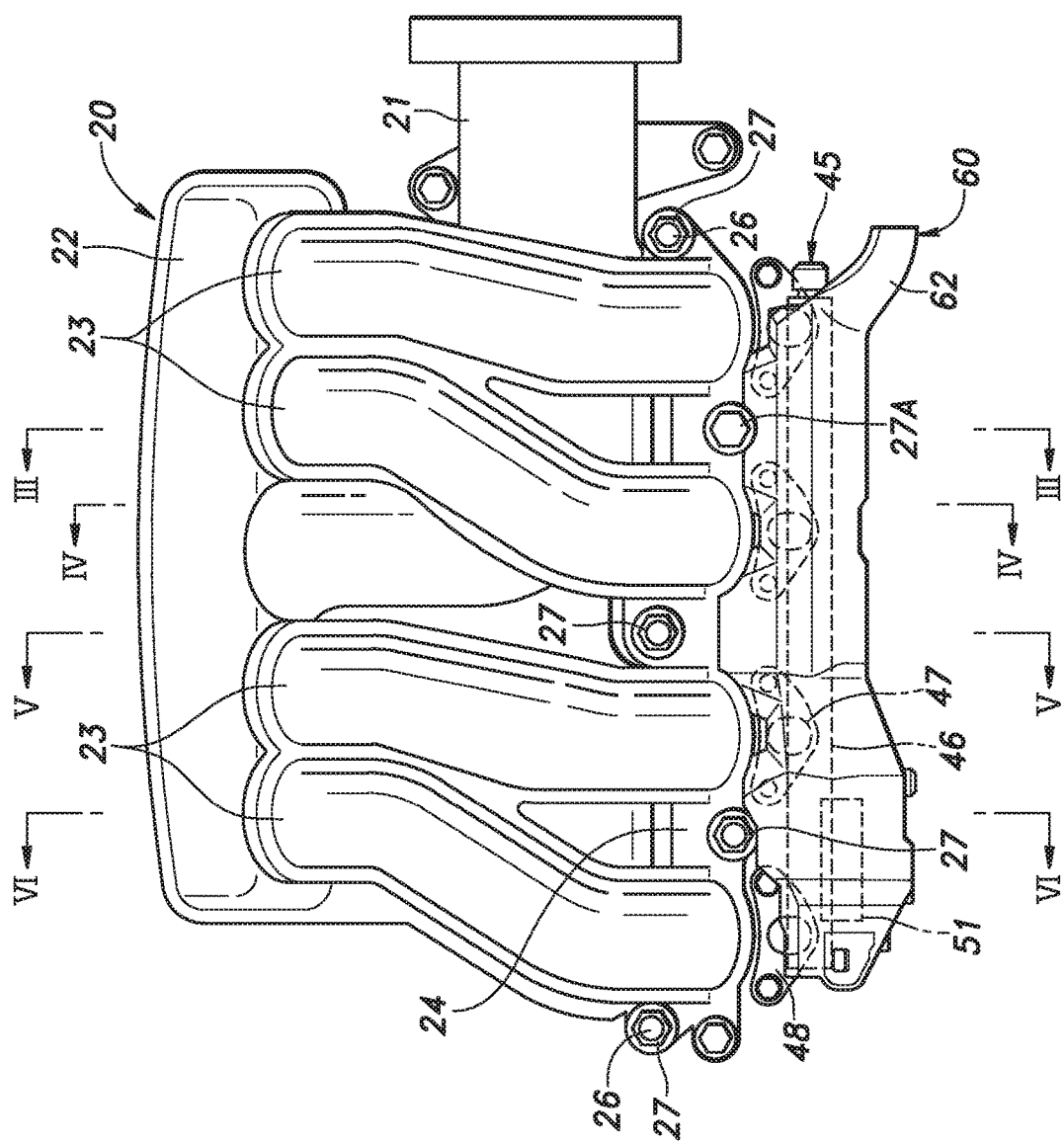
FIG. 2 is a front view of an upper part of the engine.
Figure 3:
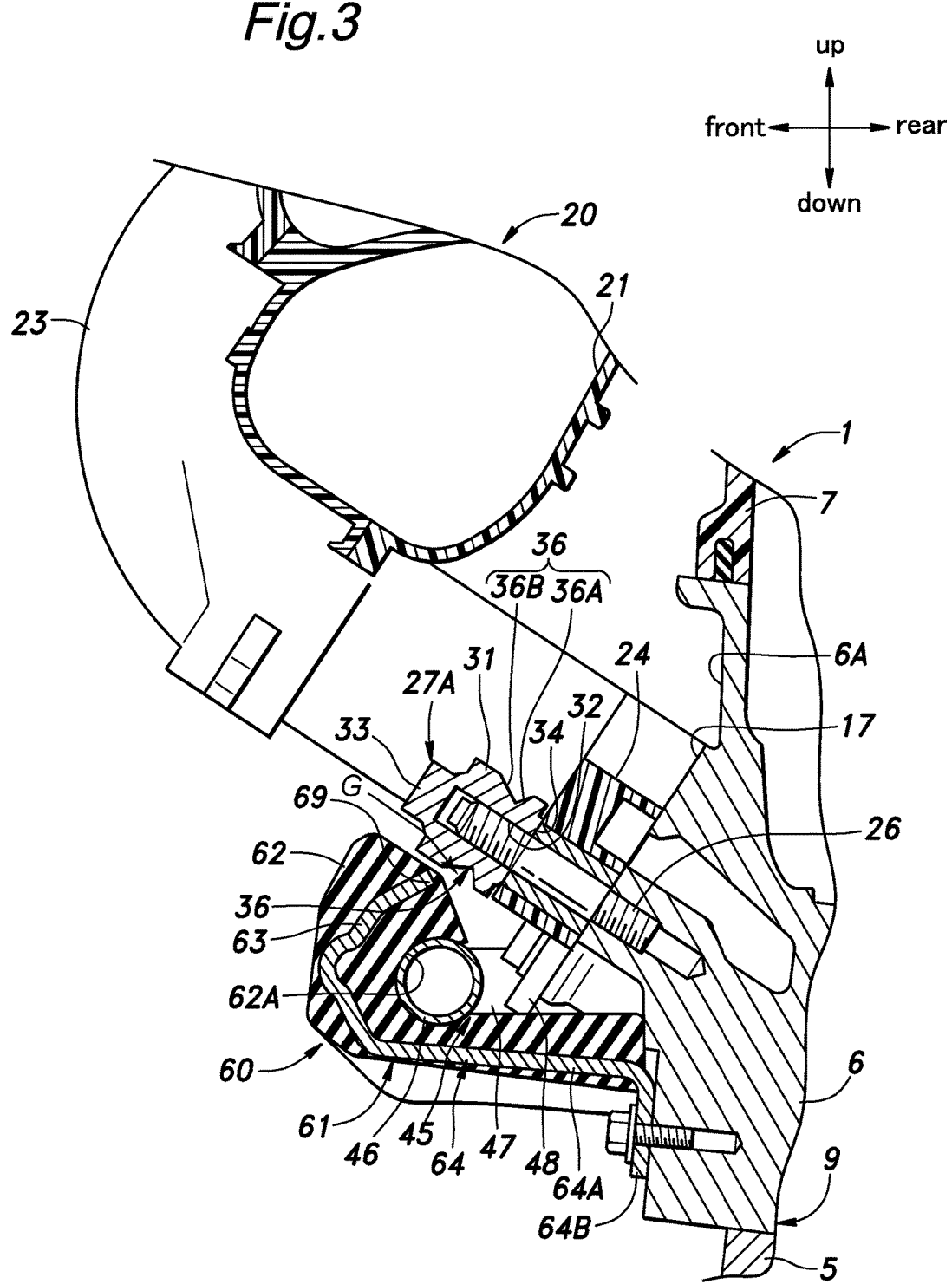
FIG. 3 is a sectional view taken along line of FIG. 2.
Figure 6:
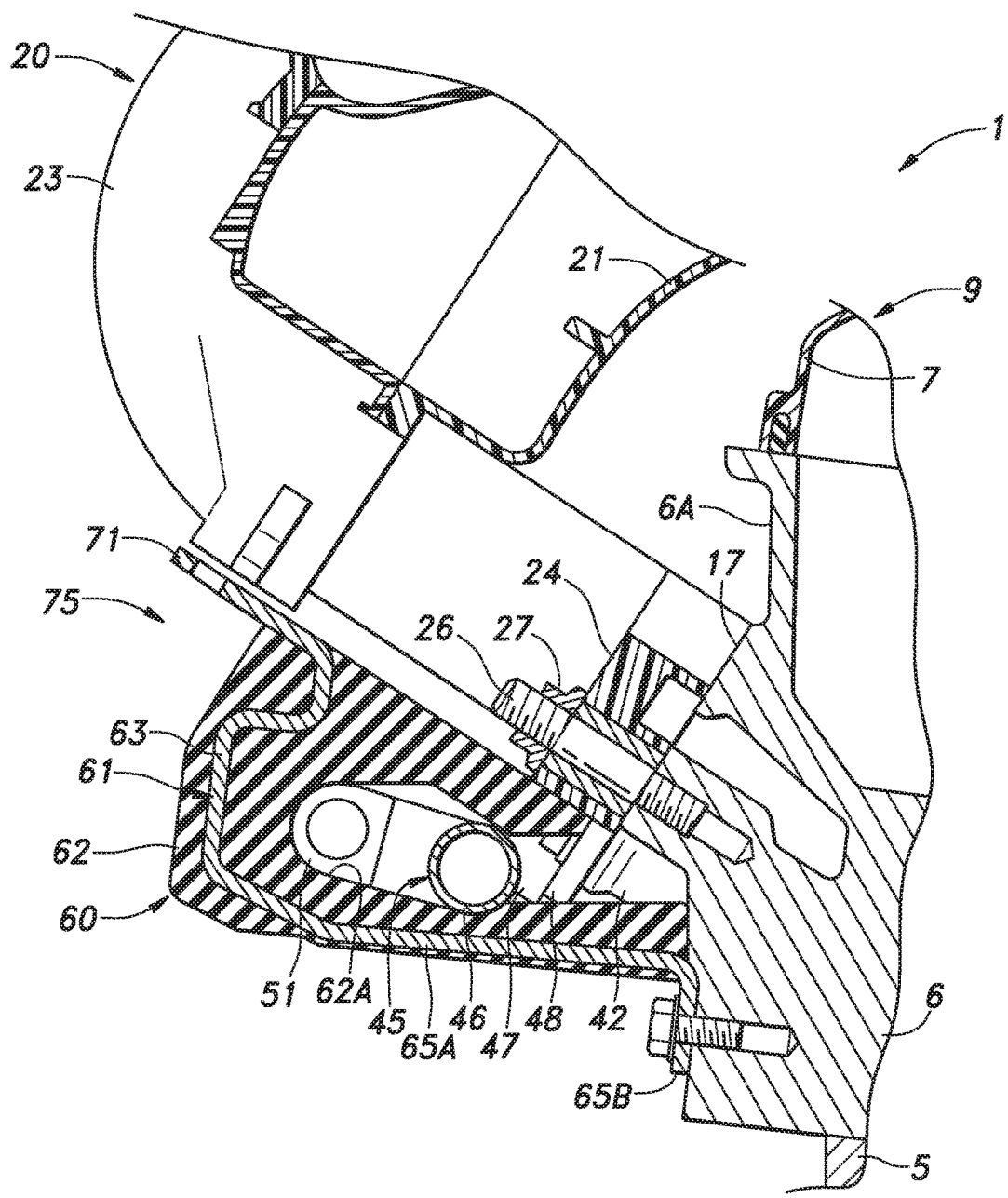
FIG. 6 is a sectional view taken along line VI-VI of FIG. 2.

As shown in FIGS. 2, 3 and 6, a plurality of stud bolts 26 project from the fastening surface 17, and are passed through corresponding bolt holes formed in the intake manifold flange 24. A metallic collar is fitted in each bolt hole. A nut 27 is threaded onto each stud bolt 26 to secure the intake manifold flange 24 to the fastening surface 17. The stud bolts 26 are positioned at two lengthwise ends of the intake manifold flange 24, and between adjoining branch pipes 23. The branch pipes 23 are named as the first to fourth branch pipes from left to right in FIG. 2. The stud bolts 26 between the first and second branch pipes 23, and between the third and fourth branch pipes 23 are located below the line passing centrally through the downstream ends of the branch pipes 23, and the stud bolts 26 at the two lengthwise ends of the manifold flange 24 and between the second and third branch pipes 23 are located above the line passing centrally through the downstream ends of the branch pipes 23.

The nut 27A threaded onto the stud bolt 26 located between the third and fourth branch pipes 23 are provided with a special configuration while the remaining nuts 27 may consist of identical nuts of normal configuration. The specially configured nut 27A consists of a cylindrical member having a threaded bore 32 and a tool engagement feature 33 such as a hexagonal part that can be engaged by a tool for fastening the nut 27A. The tool engagement feature 33 may be similar to those of the other nuts 27, but may also be different from that of the other nuts 27. The tool engagement feature 33 is located at the axial end of the nut 27A remote from the fastening surface 17. The threaded bore 32 is formed as a blind hole that extends from the axial end of the nut 27A adjoining the fastening surface 17 in the illustrated embodiment, but may also consist of a through hole.

Figure 9:
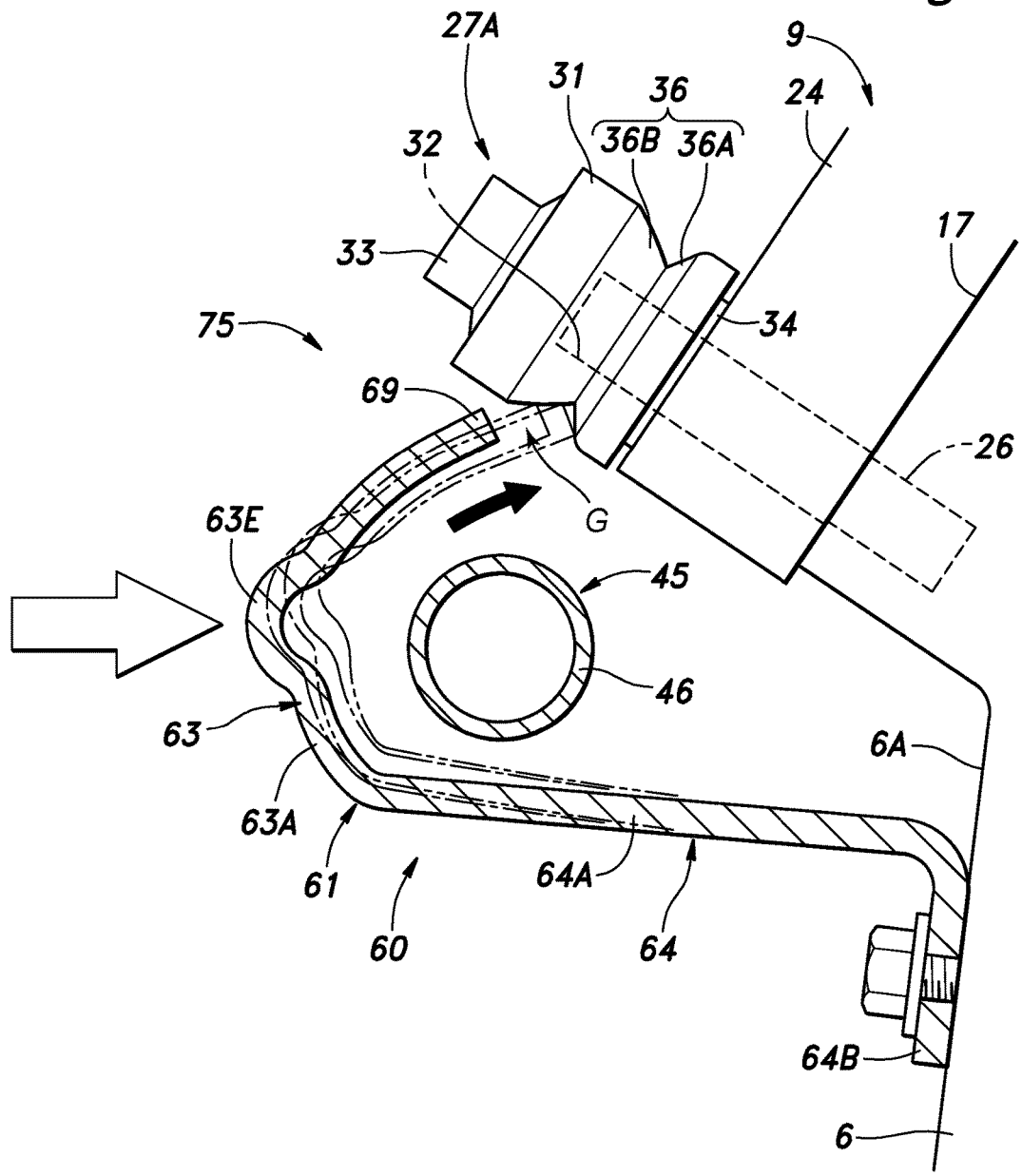
FIG. 9 is a diagram illustrating the mode of operation of the protective member.

As shown in FIGS. 3 and 9, the axial end surface of the nut 27A adjoining the intake manifold flange 24 is provided with an annular seat surface 34 abutting the intake manifold flange 24, and this annular seat surface 34 is conformal to the seating surfaces of the other nuts 27 so that all of the nuts 27 and 27A may provide a same contact surface and a same fastening force. A main part 31 of the nut 27A is generally cylindrical, and generally has a greater outer diameter than the outer diameter of the annular seat surface 34.

An annular V-shaped engagement groove 36 having a triangular cross section is formed around the outer periphery of the main part 31 of the nut 27A. In other words, the engagement groove 36 is defined by a pair of slanted surfaces consisting of a lower slanted surface (engagement surface) 36A adjacent to the intake manifold flange 24 and an upper slanted surface (guide surface) 36B remote from the intake manifold flange 24. Preferably but not exclusively, the engagement surface 36A defines a smaller angle relative to a plane perpendicular to the axial line of the nut 27A than the guide surface 36B. The two slanted surfaces are angled in two different directions with respect to a plane perpendicular to the axial line of the nut 27A and passing through the bottom of the engagement groove 36. In the illustrated embodiment, the nut 27A consists of a single piece component machined into the prescribed shape, but may consist of a plurality of pieces that are welded, fitted or otherwise assembled together.

Figure 4:
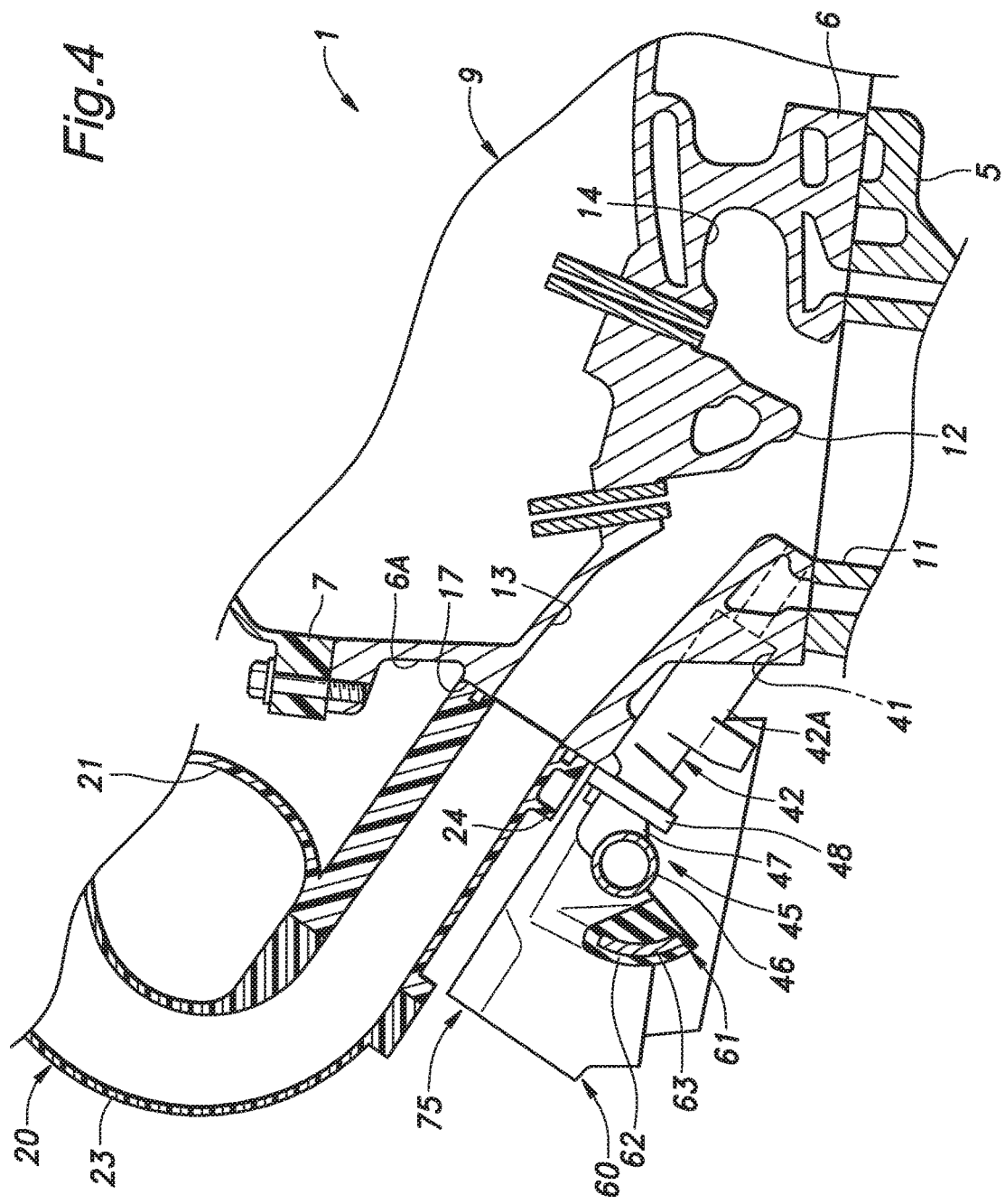
FIG. 4 is a sectional view taken along line IV-IV of FIG. 2.

As shown in FIG. 4, the cylinder head 6 is provided with four injector holes 41 extending from a part of the intake side 6A of the cylinder head 6 immediately below the fastening surface 17 into the respective combustion chambers 12. The injector holes 41 are parallel to each other, and are arranged along the cylinder row direction. The combustion chamber side of each injector hole 41 is reduced in diameter in a stepwise fashion, thereby defining an annular shoulder surface.

A fuel injector 42 is fitted into each injector hole 41. Each injector 42 is provided with a cylindrical housing 42A, and is internally incorporated with a fuel passage, a valve for selectively opening the fuel passage and an actuator for the valve not shown in the drawings. The housing 42A is reduced in diameter in the front end part thereof in a coaxial relationship, thereby defining an annular shoulder surface, and a lower side part of the base end of the injector 42 is provided with a connector for electrically connecting the actuator to a control unit and a power source.

Each injector 42 is inserted into the corresponding injector hole 41 until the shoulder surfaces of the injector 42 and the injector hole 41 abut each other, and a tip seal is interposed between the outer periphery of the front end of the injector 42 and the inner periphery of the injector hole 41 to achieve a required sealing.

As shown in FIGS. 2 to 6, a fuel pipe 45 (delivery pipe) extends along the front side (intake side 6) of the cylinder head 6. The fuel pipe 45 includes a main pipe 46 that extends along the cylinder row direction slightly below the base ends of the injectors 42 and four branch pipes 47 branching off from the main pipe 46 to the respective fuel injectors 42.

The main pipe 46 is connected to a fuel pump (not shown in the drawings) via piping at one end, and is closed at the other end.

Each branch pipe 47 of the fuel pipe 45 extends from the main pipe 46. A tubular fuel inlet (not shown in the drawings) of each injector 41 which is internally connected to the fuel passage thereof is fitted into the downstream end of the inner bore of the corresponding branch pipe 47 via an O ring (not shown in the drawings).

As shown in FIG. 4, the fuel pipe 45 is provided with a flange 48 via which the fuel pipe 45 is secured to the fastening surface 17 by using screws, and the mating surface of the flange 48 is perpendicular to the downstream ends of the branch pipes 47.

Therefore, when the flange 48 is fastened to the fastening surface 17, the injectors 42 are secured in position by being clamped between the cylinder head 6 and the branch pipes 47.

As shown in FIGS. 2 and 6, the closed end of the main pipe 46 is provided with a fuel pressure sensor 51 which projects forward.

As shown in FIGS. 1 to 6, a cover member 60 that covers the fuel pipe 45 is attached to the intake side 6A of the cylinder head 6. The cover member 60 includes a protective member 61 made of stamp formed sheet metal and a sound insulator 62 made of polymer material such as urethane foam and covering at least a part of the protective member 61, for instance, by insert molding.

The protective member 61 includes a main body 63 extending along a side of the main pipe 46 facing away from the cylinder head 6 in a spaced away relationship and a pair of legs 64 and 65 extending from the lower edge of the main body 63 in a spaced away relationship relative to each other and fixedly secured to the intake side 6A of the cylinder head 6. The legs 64 and 65 are formed by bending parts of the main body 63.

Figure 7A:
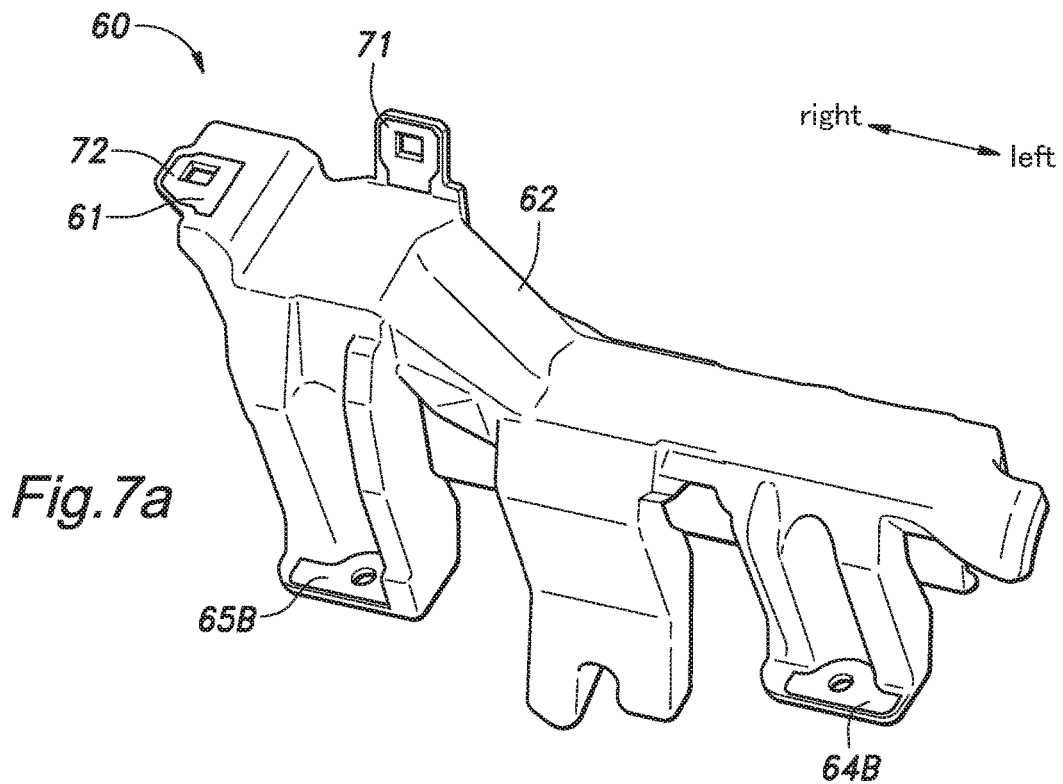
FIG. 7a is a front perspective view of a cover member.
Figure 7B:
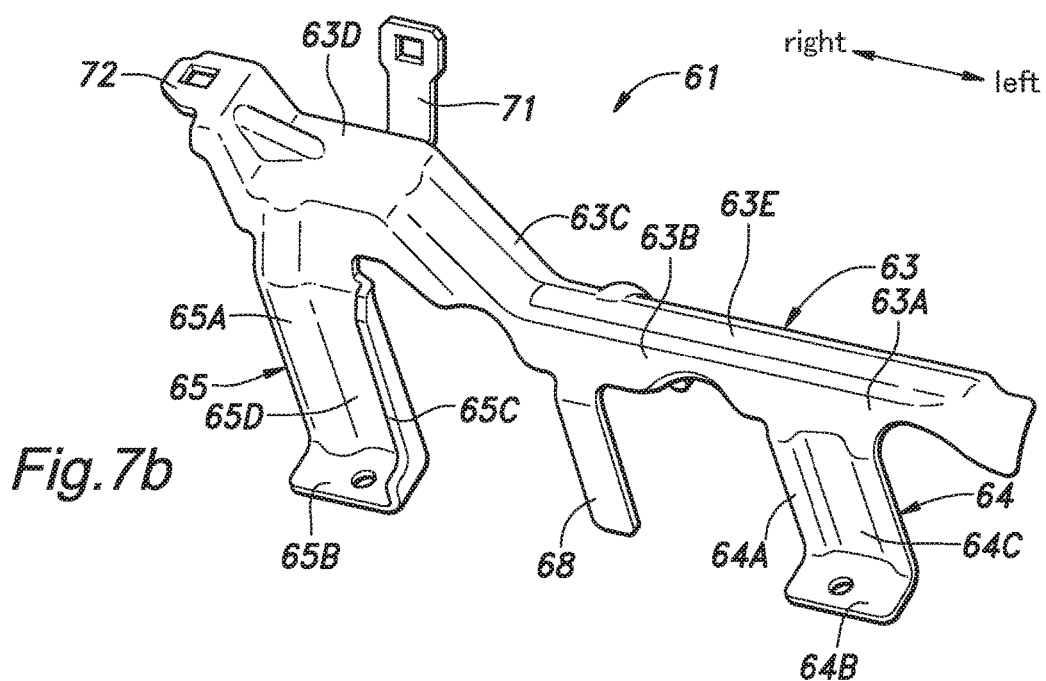
FIG. 7b is a front perspective view of a protective member.
Figure 8A:
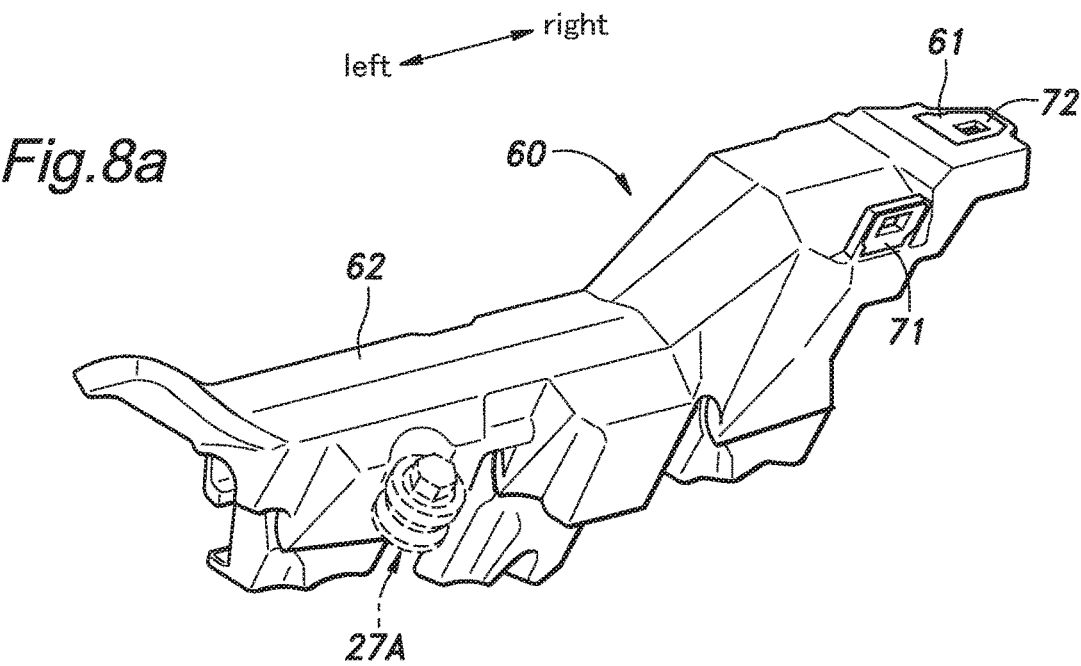
FIG. 8a is a rear perspective view of the cover member.
Figure 8B:
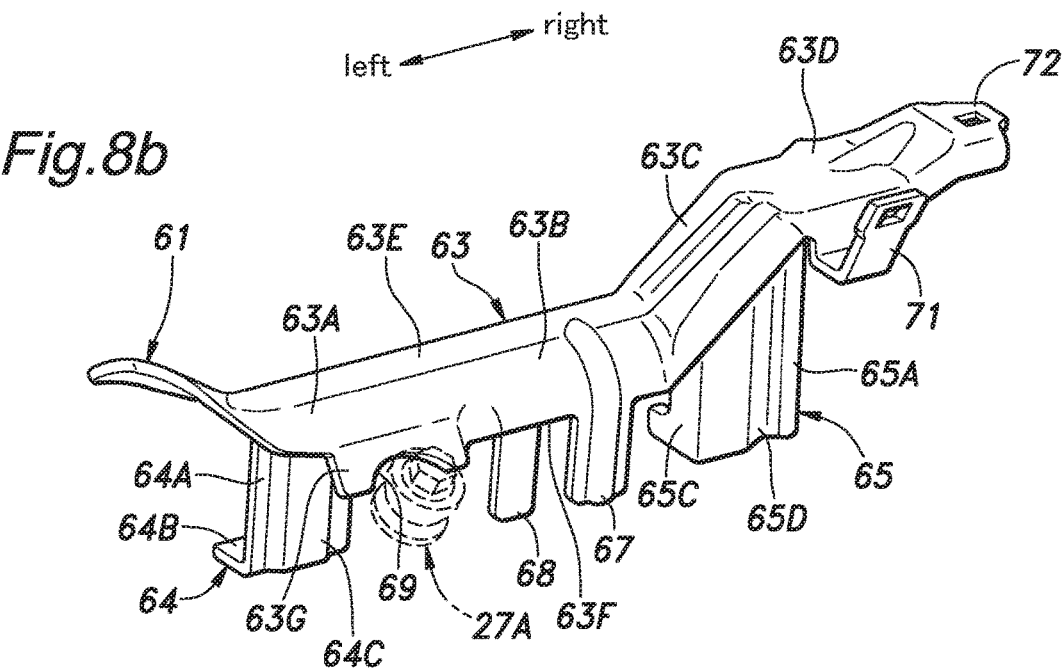
FIG. 8b is a rear perspective view of the protective member.

FIGS. 7a and 8a show the cover member 60 including the protective member 61 and the sound insulator 62. FIGS. 7b and 8b show only the protective member 61 by omitting the sound insulator 62. As shown in FIGS. 7b and 8b, the main body 63 of the protective member 61 includes a left end part 63A and a central part 63B extending along the lengthwise direction of the main pipe 46 in a substantially parallel relationship to the fastening surface 17, a slanted part 63C extending from a right end of the central part 63B along the lengthwise direction of the main pipe 46 with a slant so as to progressively move away from the main pipe 46 toward a right end part 63D thereof which extends along the lengthwise direction of the main pipe 46 in a substantially parallel relationship to the left end part 63A and the central part 63B thereof. The right end part 63D is more spaced apart from the intake side 6A of the cylinder head 6 so that the fuel pressure sensor 51 may be accommodated between the right end part 63D and the main pipe 46. The protective member 61 essentially consists of a channel member having an open end facing the main pipe 46 or the cylinder head 6. The left end part 63A, the central part 63B and the slanted part 63C are centrally provided with a bead 63E for reinforcement along the lengthwise direction of the main pipe 46.

As shown in FIGS. 3 to 7, the left leg 64 includes a main part 64A extending from the lower edge of the left end part 63A of the protective member 61 along the underside of the main pipe 46 in a spaced apart relationship relative to the protective member 61, and a fastening part 64B which is bent from the main part 64A so as to abut flatly on the intake side 6A of the cylinder head 6. Thus, the main part 64A of the left leg 64 has a major plane facing substantially vertically. The right leg 65 includes a main part 65A extending from the lower edge of the right end part 63D of the protective member 61 along the underside of the main pipe 46 in a spaced apart relationship relative to the protective member 61, a fastening part 65B which is bent from the main part 65A so as to abut flatly on the intake side 6A of the cylinder head 6, and a reinforcement flange 65C which is bent from the left edge of the main part 65A and the fastening part 65B by an angle of about 90 degrees in each case. Thus, the main part 65A of the right leg 65 has a major plane facing substantially vertically. The main part 65A of the right leg 65 is longer than the main part 64A of the left leg 64. The main parts 64A and 65A of the left and right legs 64 and 65 are provided with respective reinforcement beads 64C and 65D along the lengths thereof.

Figure 5:
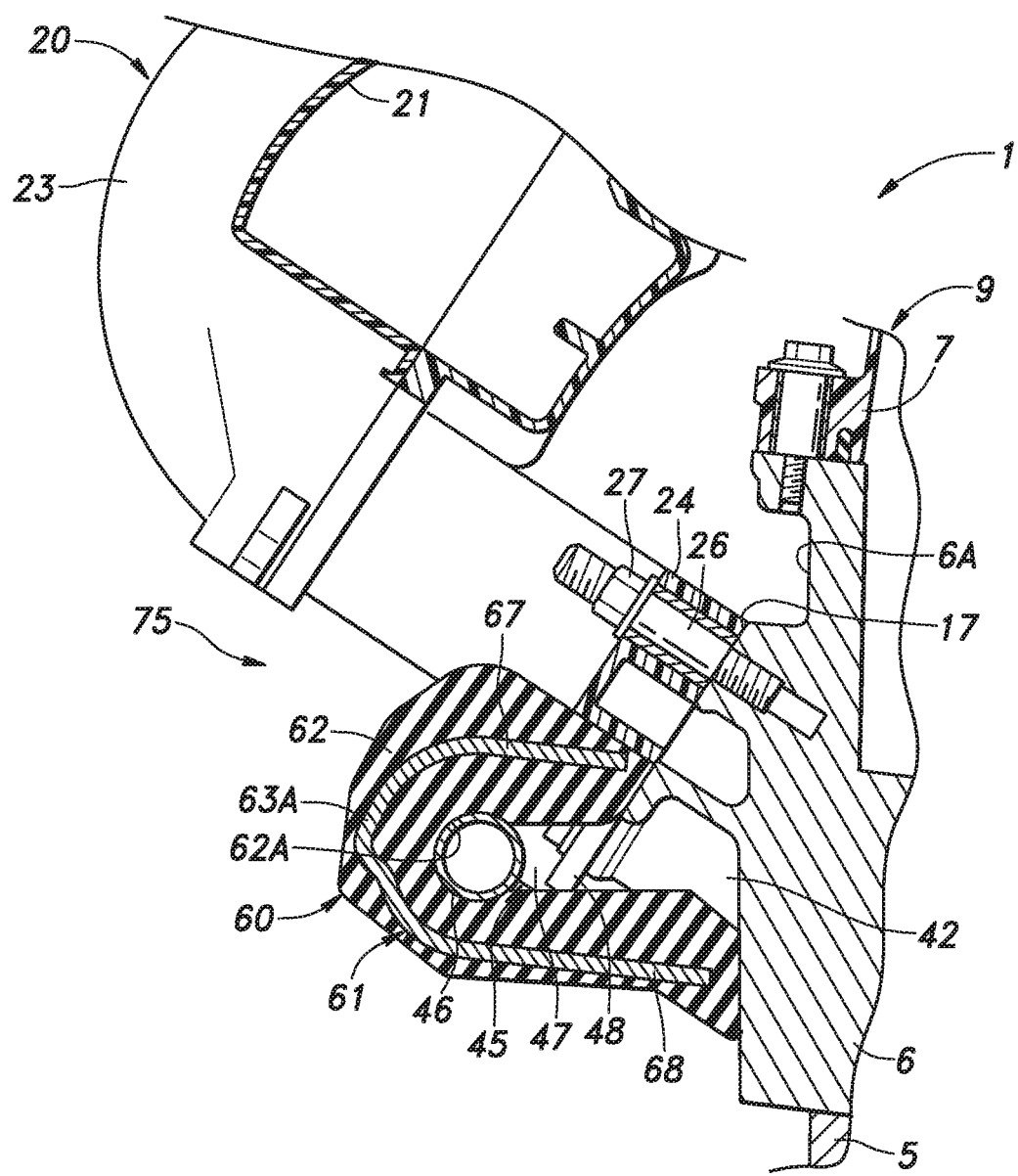
FIG. 5 is a sectional view taken along line V-V of FIG. 2.

The upper edge 63F of the protective member 61 is located above the main pipe 46. As shown in FIGS. 5 and 8b, a first depending piece 67 extends from the upper edge 63F of the central part 63B of the protective member 61 above the main pipe 46, and has a free end opposing the fastening surface 17 of the intake side 6A at a prescribed distance. As shown in FIGS. 5 and 7b, a second depending piece 68 extends from the lower edge of the central part 63B of the protective member 61 below the main pipe 46, and has a free end opposing the intake side 6A of the cylinder head 6 at a prescribed distance.

A projection 63G extends from a part of the upper edge 63F of the left end part 63A of the protective member 61 corresponding to the left leg 64 extending from the lower edge of the left end part 63A in lateral position, and aligns vertically with the nut 27A. The free end of the projection 63G is formed as a concave edge 69 having a semi-circular profile. The radius of curvature of the concave edge 69 is preferably equal to or greater than the radius of the nut 27A at the bottom of the groove 36.

The free end of the projection 63G extends toward the nut 27A with a downward slant with respect to a plane perpendicular to the axial line of the nut 27A and an upward slant with respect to a horizontal plane, and opposes the engagement groove 36 via a gap, indicated generally at G. The two legs 64 and 65 extend from the intake side 6A of the cylinder head 6 horizontally or with a slight upward slant with respect to a horizontal plane.

A first tab 71 extends from the upper edge 63F of the right end part 63D of the protective member 61, and is bent upward. A second tab 72 projects from the right edge of the right end part 63D. The first and second tabs 71 and 72 are provided with openings in respective free end parts thereof for engaging clips that retain a wire harness.

The sound insulator 62 is wrapped around the protective member 61 substantially entirely except for the fastening parts 64B and 65B of the legs 64 and 65, and the first and second tabs 71 and 72. The sound insulator 62 defines a receiving groove 62A opening out toward the intake side 6A of the cylinder head 6 and receiving the main pipe 46 of the fuel pipe 45 and the fuel pressure sensor 51 therein, either closely or in a spaced apart relationship.

The protective member 61 and the nut 27A jointly form a protective structure 75 for the fuel pipe 45 for protecting the fuel pipe 45A from the impact of a frontal crash of the vehicle.

As shown in FIG. 1, the engine room 3 is defined in a front part of the vehicle body 2 by a front bulkhead 86, a pair of front fenders (not shown in the drawings), a dash panel 83 separating the rear end of the engine room 3 from the passenger compartment, and an engine hood 84 constituting an upper surface of the front part of the vehicle body 2. The front bulkhead 86 includes an upper cross member 86A, a lower cross member 86B and a pair of side members (not shown in the drawings) extending between respective side ends of the upper and lower cross members 86A and 86B. The side members are connected to respective front side frames (not shown in the drawings) of the vehicle body 2 extending in the fore and aft direction. The lateral ends of the front dash panel 83 are also connected to the side members. A front grill 81 and a front bumper face 82 are provided in front of the front bulkhead 86.

The front bulkhead 86 internally supports a radiator unit 87 including a radiator core 87A and a fan 87B. The front side of the bulkhead upper cross member 86A supports a sensor 88 for detecting objects in front, such as a millimeter wave radar, a ultrasonic radar and an infrared radar.

The engine 1 is positioned between the front bulkhead 86 and the dash panel 83. The fuel pipe 45, the cover member 60 (protective member 61), the sensor 88 and the bulkhead upper cross member 86A are positioned at a substantially same elevation.

The mode of operation of the protective structure 75 for the fuel pipe 45 at the time of a frontal crash is described in the following with reference to FIG. 9. At the time of a frontal crash, the sensor 88 and the upper cross member 86A are displaced rearward, and push the protective member 61 rearward. Because the fastening parts 64B and 65B are secured to the cylinder head 6, the protective member 61 is bent upward such that the free end of the projection 63G rotates upward around the fastening parts 64B and 65B. As a result, the concave edge 69 of the projection 63G abuts the upper slanted surface 36B, and slides down the upper slanted surface 36B until the concave edge 69 of the projection 63G reaches the bottom of the engagement groove 36. As a result, any further deformation of the protective member 61 is prevented by the lower slanted surface 36A, and the fuel pipe 45 is prevented from being subjected to the impact load by the protective member 61. At this time, the sound insulator 62 is interposed between the fuel pipe 45 and the protective member 61 so that the load that may act on the fuel pipe 45 via the protective member 61 can be evenly distributed on the surface of the fuel pipe 45.

The groove 36 is provided in the enlarged nut 27A that is threaded onto the stud bolt 26, and is therefore located at some distance from the intake side 6A of the cylinder head 6. Thus, the length of the part of the protective member 61 extending between the point of impact (front end) of the protective member 61 to the free end of the abutting projection 63G is reduced as compared to the case where the engagement feature is provided directly on the intake side 6A so that the stiffness of this part of the protective member 61 is increased.

Because the protective member 61 and the intake manifold flange 24 of the intake manifold 20 do not overlap each other as seen in the axial direction of the nut 27A, the presence of the protective member 61 does not obstruct the assembling and dismantling of the nut 27A and the intake manifold 20.

Because the left leg 64 and the projection 63G are laterally aligned with each other, the impact load is prevented from causing a twisting load on the protective member 61 so that the protective action of the protective member 61 can be ensured.

Because the free end of the projection 63G is provided with a concave configuration (concave edge 69) complementary to the groove 36 (more precisely, the part of the nut 27A at the bottom of the groove 36), the projection 63G can be correctly aligned with the nut 27A at the time of an impact without fail. Furthermore, the contact area between the free end edge of the projection 63G and the engagement groove 36 of the nut 27A can be maximized.

Because the engagement feature is provided in a member such as a nut that can be detachably attached to the engine main body 9, instead of being formed on the engine itself, the manufacturing cost can be reduced, and any modification in the design of the engagement feature can be performed without any difficulty.

Particularly, when the fastening member consists of a nut for a stud bolt for securing the intake manifold flange to the fastening surface of the engine main body, and is configured to be fastened by a same tool as the remaining nuts, the efficiency of the assembly process can be improved. If the nut with the engagement feature has a same contact surface as the remaining nuts, all of the nuts can be fastened with a same fastening torque so that the efficiency of the assembly process can be improved.

Although the present invention has been described in terms of a preferred embodiment thereof, it is obvious to a person skilled in the art that various alterations and modifications are possible without departing from the scope of the present invention.

The invention claimed is:

1. An internal combustion engine configured to be mounted to a vehicle body, comprising:
    an engine main body having a plurality of intake ports opening out on an intake side thereof facing forward with respect to the vehicle body;
    an intake manifold attached to the intake side via a fastening member, and extending upward with respect to the vehicle body;
    a fuel pipe extending along the intake side under the intake manifold and connected to a plurality of injectors fitted into the intake side; and
    a protective bracket having a bracket main body covering a front part of the fuel pipe, and a bracket leg extending rearward from a lower part of the bracket main body under the fuel pipe, the bracket leg being secured to the intake side;
    wherein the fastening member includes a fastening member abutting portion projecting forward from the intake manifold, and the bracket main body is provided with a bracket abutting portion in an upper end thereof, the bracket abutting portion opposing the fastening member abutting portion from a front direction via a gap so as to abut the fastening member abutting portion when the bracket main body is pushed rearward in a frontal vehicle crash.

2. The internal combustion engine according to claim 1, wherein the bracket main body is positioned so as not to overlap with the fastening member as seen from an axial direction of the fastening member.

3. The internal combustion engine according to claim 1, wherein the fastening member abutting portion is provided with a guide surface opposing the bracket abutting portion from rear via a gap so as to abut the fastening member abutting portion when the bracket main body is pushed rearward in a frontal vehicle crash, and an engagement surface connected to a rear end of the guide surface, the guide surface and the engagement surface defining an engagement groove.

4. The internal combustion engine according to claim 1, wherein the bracket abutting portion and the bracket leg are positioned so as to align with each other with respect to a lateral direction.

5. The internal combustion engine according to claim 1, wherein a sensor for detecting an object ahead of a vehicle is positioned in front of the protective bracket.

6. The internal combustion engine according to claim 1, wherein the bracket abutting portion comprises a substantially semicircular recess configured to at least partly receive the fastening member abutting portion.

7. The internal combustion engine according to claim 1, wherein the fastening member comprises a stud bolt projecting from the intake side and passed through the intake manifold, and a nut threaded with the stud bolt so as to interpose the intake manifold jointly with the intake side and forming the fastening member abutting portion.

8. The internal combustion engine according to claim 7, wherein the nut is provided with an annular engagement groove extending in a circumferential direction on an outer circumference thereof and serving as the fastening member abutting portion.

9. The internal combustion engine according to claim 8, wherein the nut includes a tubular portion provided with a female thread hole on an inner circumference thereof and the engagement groove on an outer circumference thereof, a fastening seat provided on a side of the tubular portion facing the intake manifold and configured to abut the intake manifold, and a tool engagement portion provided on a side of the tubular portion facing away from the fastening seat, and
    a contact area between the intake manifold and the fastening seat is equal to a contact area between the intake manifold and another nut fastening the intake manifold to the intake side, the tool engagement portion having a same outer profile as the other nut.

* * * * *